United States Patent
Coomes

(10) Patent No.: US 11,603,865 B1
(45) Date of Patent: Mar. 14, 2023

(54) APPARATUS FOR SAFELY ENABLING AIR FILTERING WITH BOX FANS AND FILTER

(71) Applicant: IBOW2U LLC, Fallston, MD (US)

(72) Inventor: Michael Coomes, Jarrettsville, MD (US)

(73) Assignee: IBOW2U LLC, Fallston, MD (US)

(*) Notice: Subject to any disclaimer, the term of this patent is extended or adjusted under 35 U.S.C. 154(b) by 0 days.

(21) Appl. No.: 17/901,206

(22) Filed: Sep. 1, 2022

Related U.S. Application Data

(63) Continuation of application No. 17/856,349, filed on Jul. 1, 2022.

(60) Provisional application No. 63/251,944, filed on Oct. 4, 2021.

(51) Int. Cl.
*B01D 46/00* (2022.01)
*F04D 19/00* (2006.01)
*F04D 29/70* (2006.01)
*G08B 21/18* (2006.01)

(52) U.S. Cl.
CPC ....... *F04D 29/703* (2013.01); *B01D 46/0004* (2013.01); *B01D 46/0005* (2013.01); *B01D 46/0041* (2013.01); *B01D 46/0086* (2013.01); *F04D 19/002* (2013.01); *G08B 21/18* (2013.01); *B01D 2265/023* (2013.01); *B01D 2265/027* (2013.01); *B01D 2279/50* (2013.01)

(58) Field of Classification Search
CPC ............ B01D 46/0004; B01D 46/0005; B01D 46/0041; B01D 46/0086; B01D 2265/023; B01D 2265/027; B01D 2279/50; F04D 29/703; F04D 19/002

USPC ....... 55/385.1, 471–473, 511, 480, 481, 478, 55/493, 506, 490
See application file for complete search history.

(56) References Cited

U.S. PATENT DOCUMENTS

| | | | |
|---|---|---|---|
| 4,781,526 A | 11/1988 | Mead | |
| 5,223,006 A * | 6/1993 | Moran, III | G06F 1/182 55/385.6 |
| 5,958,114 A * | 9/1999 | Sunahara | F24F 1/008 96/417 |
| 6,440,190 B1 * | 8/2002 | Goyetche | B01D 46/10 55/438 |
| 6,527,838 B2 | 3/2003 | Volo et al. | |
| 7,393,272 B2 * | 7/2008 | Sundet | F24F 13/28 416/247 R |

(Continued)

*Primary Examiner* — Minh Chau T Pham
(74) *Attorney, Agent, or Firm* — Larry J. Guffey, Esq.; Oliver & Grimsley, LLC

(57) ABSTRACT

An apparatus for safely enabling air filtering by temporarily joining a box fan to a replaceable air filter includes: (a) an air chamber frame with a rear portion that is configured to accommodate the replaceable air filter, (b) a frame stabilizing means that includes a front mounting platform which is configured to temporarily hold a box fan that is oriented to pull air through the filter, (c) a gasket that is configured to attach to the frame's front surface and minimize air flow around the gasket and into the frame, (d) a vent door located in the frame and configured to open to allow air to enter the frame's interior region when the filter is clogged, (e) an alarm mechanism attached to the vent door and configured to provide a signal when the door is been opened, and (f) an alarm device configured to receive the alarm mechanism's signal and provide an alarm that the air filter needs replacement.

20 Claims, 3 Drawing Sheets

(56) References Cited

U.S. PATENT DOCUMENTS

| | | | |
|---|---|---|---|
| 8,002,868 B2* | 8/2011 | Kim | F24F 13/20 55/498 |
| 8,137,426 B2 | 3/2012 | Whittemore | |
| 8,312,873 B2* | 11/2012 | Gagas | F24C 15/2092 126/299 R |
| 8,734,553 B2* | 5/2014 | Sakashita | F24F 13/20 55/296 |
| 8,979,965 B2 | 3/2015 | Minaeeghainipour | |
| 9,120,043 B2* | 9/2015 | Johansson | B01D 46/0086 |
| 9,931,591 B2* | 4/2018 | Galsim | B01D 46/0086 |
| 2002/0007735 A1* | 1/2002 | Volo | B01D 46/10 55/467 |
| 2004/0118093 A1* | 6/2004 | Chang | B01D 46/10 55/482 |
| 2012/0240848 A1* | 9/2012 | Amundsen | B01D 46/10 55/383 |
| 2013/0340400 A1* | 12/2013 | Minaeeghainipour | B01D 46/0002 55/511 |
| 2014/0215981 A1* | 8/2014 | Pfannenberg | F04D 29/703 55/501 |
| 2015/0373875 A1* | 12/2015 | Kira | H05K 7/20581 55/309.1 |
| 2016/0025110 A1* | 1/2016 | Whittemore | B01D 46/10 55/501 |

\* cited by examiner

APPARATUS FOR SAFELY ENABLING AIR FILTERING WITH BOX FANS AND FILTER

CROSS-REFERENCE TO RELATED APPLICATION

This Application is a continuation of U.S. patent application Ser. No. 17/856,349 that was filed Jul. 1, 2022 and claims the benefit of Provisional Patent Application No. PPA 63/251,944, filed Oct. 4, 2021 by the present inventor. The teachings of this application are incorporated herein by reference to the extent that they do not conflict with the teaching herein.

BACKGROUND OF THE INVENTION

1. Field of the Invention

The present invention generally relates to gas separation and air filtration. Specifically, the present invention is directed to an attachment apparatus for a box fan that safely provides it with air filtration capabilities.

2. Description of the Related Art

Replaceable air filters for portable box fans are known. Examples include: U.S. Pat. No. 4,781,526 to Mead (bracket structure mounted on fan for receiving a filter in sliding fashion); U.S. Pat. No. 7,393,272 to Sundet (adhesive-attached hooks mounted on the sides of the fan, with elastic straps extending through the hooks to hold a filter to the face of the fan); U.S. Pat. No. 6,527,838 to Volo et al. (stick-on right-angled brackets mounted on the fan with adjustable clearance to snugly hold filters against the faces of a fan); U.S. Pat. No. 8,137,426 to Whittemore (filter frame removably mounted against the face of a box fan with straps or cords to receive a filter), and U.S. Pat. No. 8,979,965 to Minaeeghainipour (magnetically mounting filter to fan).

Despite these previous attempts to provide portable, box fans with convenient air filtration capabilities, there appear to be no such commercially viable products in the marketplace. Thus, it would appear that there continues to exist the need for an apparatus that can provide air filtration capabilities to a box fan in a convenient, safe, economical and aesthetically acceptable manner. The present invention seeks to provide such an apparatus.

DESCRIPTION OF THE PREFERRED EMBODIMENT

Figure 1:
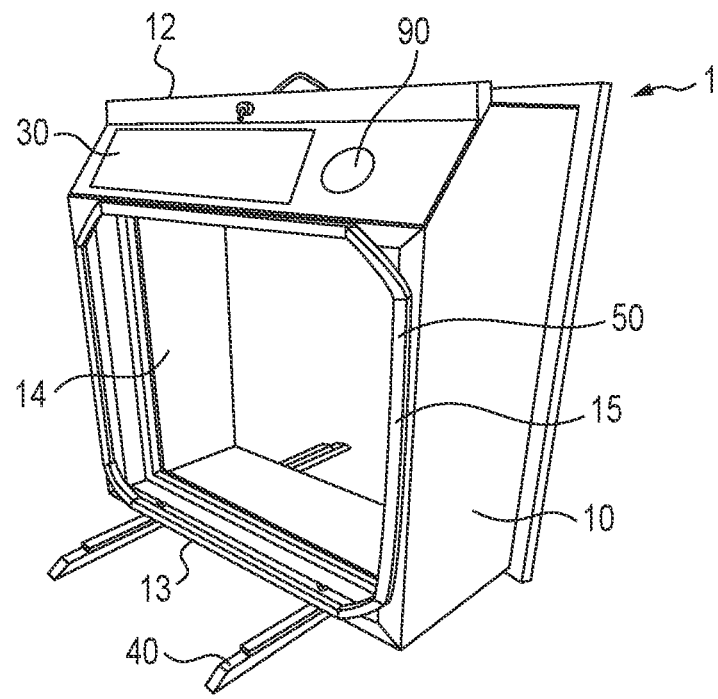
FIG. 1 is a front perspective view of the present invention.

Recognizing the need for an apparatus that can provide air filtration capabilities to a box fan in a convenient, safe, economical and aesthetically acceptable manner, the present invention seeks to provide such an apparatus.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

FIG. 1 is a front, perspective view of the present invention in the form of an apparatus 1 (or a "Gladbreath Box" or "Gladbreath" box) for safely enabling air filtering by a rectangular box fan 4 that pulls air through a replaceable air filter 2. This apparatus is seen to include a rectangular, air chamber frame 10 having two sides 11 and a top 12 and a bottom 13 and wherein these enclose an interior region 14 that consists of a front 14a and a rear 14b portion.

Figure 2:
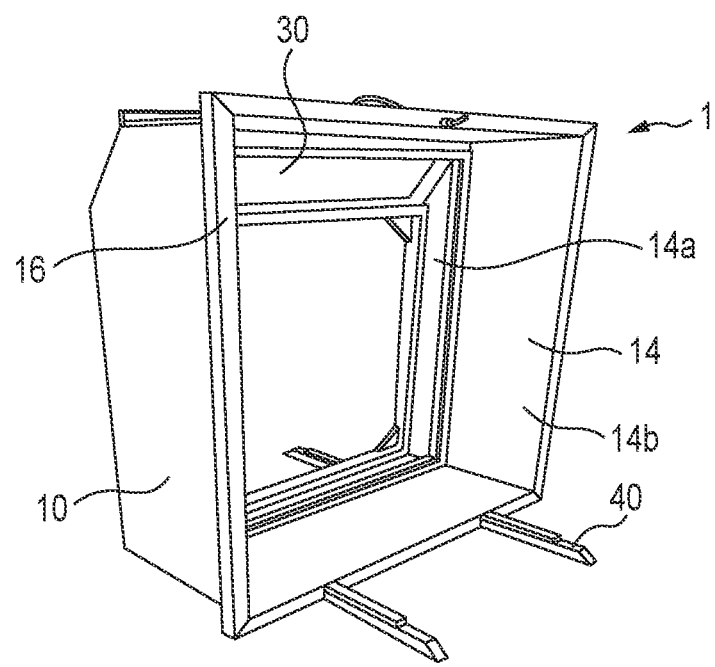
FIG. 2 is a rear perspective view of the present invention.

The sides, top and bottom all have front and rear edges. The front and rear edges combine, respectively, to define the front 15 and rear 16 surfaces of this air chamber frame. See also FIG. 2.

Figure 3:
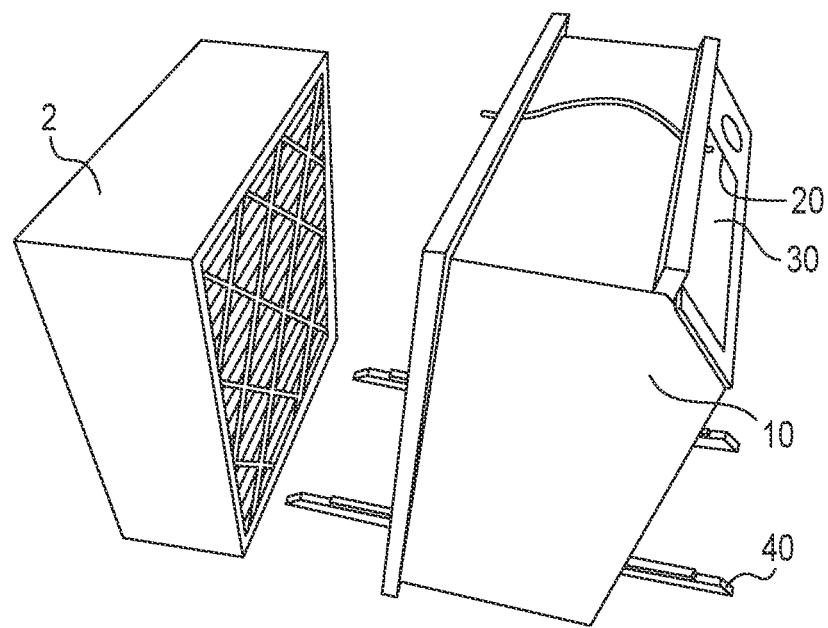
FIG. 3 is a side perspective view of the present invention which also show a replaceable air filter that is about to be temporarily installed in the rear portion of the interior region of the present invention.
Figure 4:
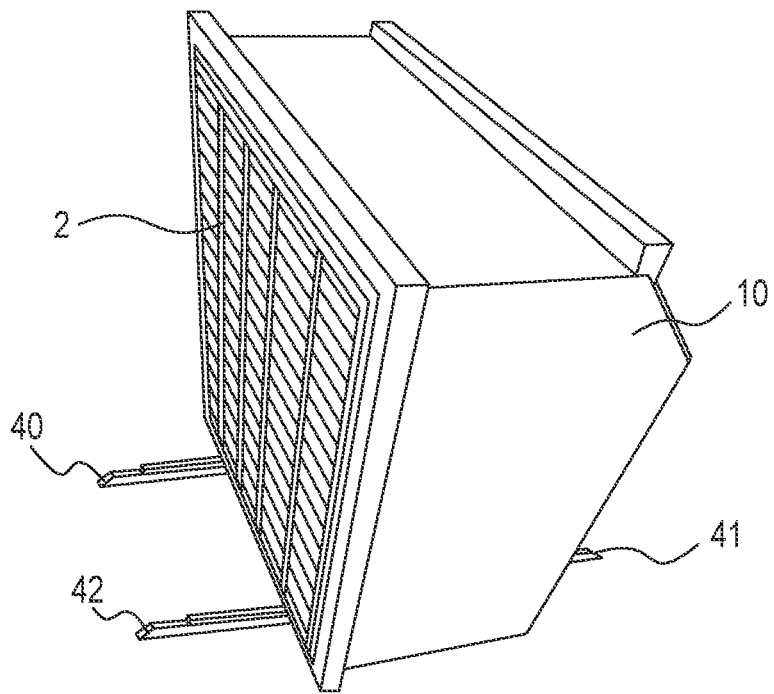
FIG. 4 is a side perspective view of the present invention after a replaceable air filter has been temporarily installed in the rear portion of the interior region of the present invention.

A comparatively large opening 20 in the frame's top (i.e., the area of the door is in the range of ⅙-¹⁄₁₀ of the area of the box fan's face) provides access to the front portion of the frame's interior region. Within this opening is situated a hinged door or door vent or damper device 30. See FIG. 3 where this door can be seen to be partially opened. It is configured to move between a closed and an open position to allow air to enter the frame's interior region in front of where a replaceable air filter sits in the rear portion 14b of the frame's interior region. See FIG. 4.

The hinges or door opening mechanism 30 for this door, in conjunction with the design of the door itself, is designed to open it when a partial vacuum is created within the front portion 14a of frame's interior region due to a decreased airflow through the filter resulting from it having become clogged after an extended period of use. Such a situation puts an undesirable strain on the motor of the box fan and can lead to unsafe fan operating conditions and present a possible fire hazard. The door's movement is itself an indication of a partially clogged (and therefore needing to be changed) air filter.

To achieve this desired operability of the door, it has been constructed from a light weight, foam board material. It is essential that it be large enough that when it opens only a small way (e.g., the door's unhinged side moves through an angle of only approximately 10 degrees or less), this movement will be sufficient to allow enough air to enter through the door to offset a clogged filter to thereby decrease the strain on motor of the box fan that is temporarily located on the frame's front platform.

Hook and loop hinges 32 easily attach to this board and allow it to open. A strip of wood 34 is glued across side of the door that is opposite its hinges. This adds weight to this side and enhances a pendulum-swinging action of the door, while also providing some material for installing an alarm mechanism to monitor the door's movement. A small spring on the inside of each end of the door ensures its tight closure; with the spring constant of the spring having been chosen so that it is weak enough to allow a small vacuum in the frame's front portion to open the door. See FIGS. 2 and 6.

An air chamber stabilizing means 40 is attached to the frame's bottom (e.g., an elongated, flat rod that is attached proximate either side of the bottom and oriented so that its ends extend in front of and behind the frame so as to prevent it from tipping either forward or backward). It is configured to prevent the air chamber frame from tipping over, while also providing a front 41 and a rear 42 mounting platform on which to temporarily locate, when said apparatus is in use, rectangular box fans. As shown in FIGS. 1-4, this means can take the form of two parallel rods or projections, one of which is proximate either of the two outer edges of the frame's bottom side and oriented so that they extend, respectively, perpendicularly from the frame's front 15 and rear 16 surfaces.

This anti-tipping feature of the present invention is a safety feature since a standard box fan with a filter directly attached to it can often be easily tipped over. The danger comes because these fans usually don't automatically turn off when tipped, and can consequently, because of their restricted air flow when tipped, heat up and cause failure of the fan unit, or worse, a fire. If such a directly attached filter is dirty, it can also spill dust all around the region surrounding the tipped over fan.

A gasket 50 is configured to attach to the edges of the frame's front surface and be compressed between the frame and the temporarily adjoining box fan so as to minimize air flow around the gasket and into the front portion of frame's interior region when the box fan is operating. This gasket also reduces vibrations in the combination and thereby helps to filter out any undesirable sounds coming from the combination.

Figure 5:
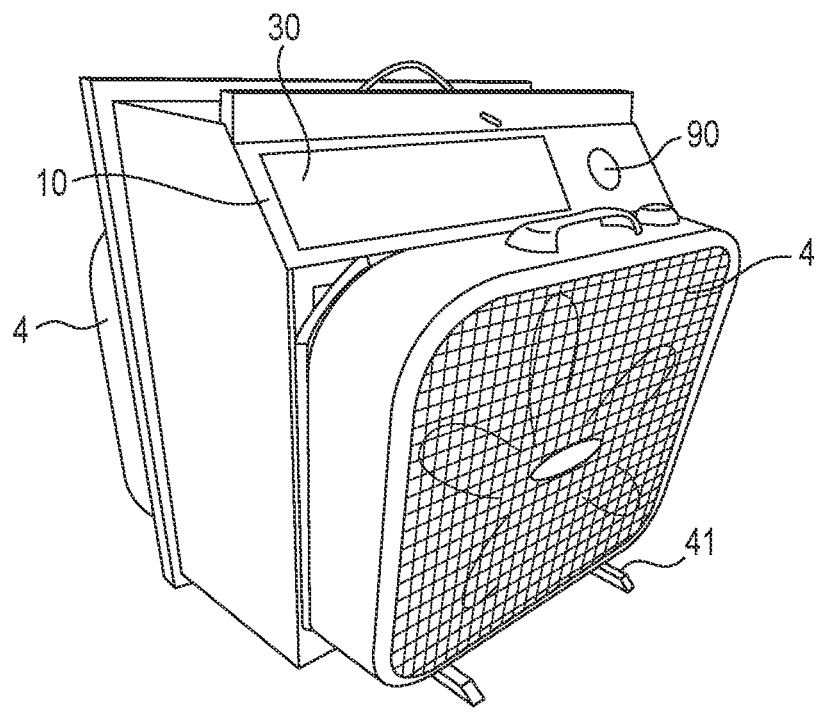
FIG. 5 is a front perspective view of the present invention after a rectangular, box fan has been temporarily located on top of both the front and rear mounting platforms of the air chamber frame stabilizing means of the present invention and an attachment means is being used to adhere the box fans to the present invention.

See FIG. 5 where a box fan, attachment means 60 is shown. It can be seen to be configured as a strap or straps that are attached to the frame for temporarily adhering one or more box fans to the frame (as shown in FIG. 5, with a box fan located on the front 41 and rear 42 mounting platforms of the frame's stabilizing means 40). This serves to be useful in enhancing the combination's portability.

Figure 6:
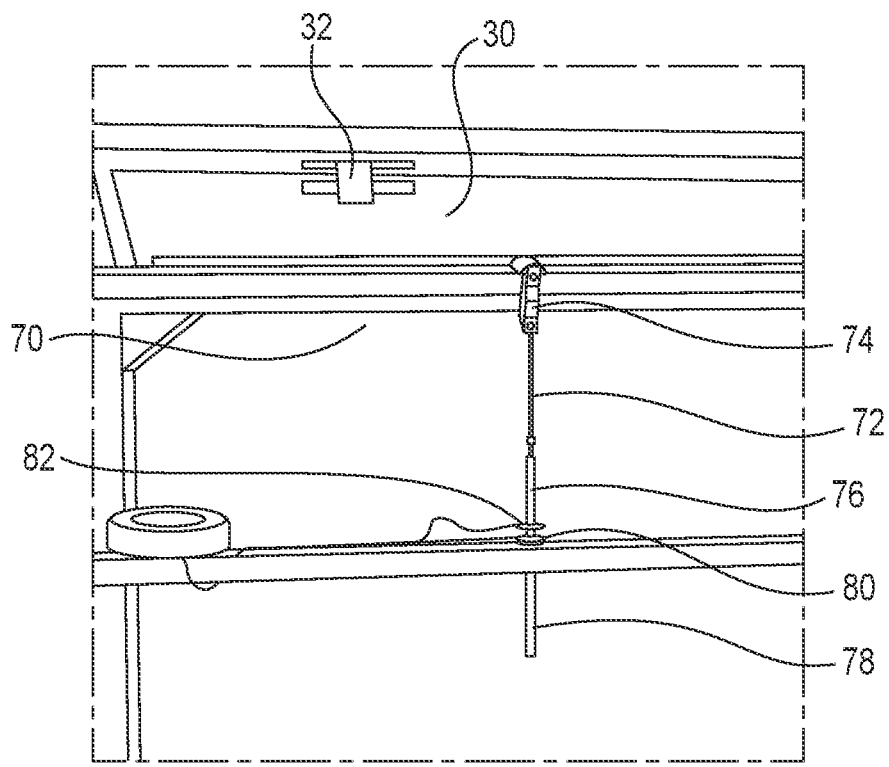
FIG. 6 is a closeup, rear perspective view of a portion of the present invention that shows its door opening mechanism and an attached, alarm mechanism which is configured to provide a signal when the door has been opened to such an extent that it indicates an excess strain is being placed of the motor of the rectangular box fan that is sitting on the invention's front mounting platform and pulling air through the replaceable air filter.

An alarm mechanism 70 is attached to the invention's door 30 and configured to provide a signal when the door has achieved a specified degree of openness. FIG. 6 is a closeup, rear perspective view of a portion of the present invention that shows the details of one type of alarm mechanism that can be used with the present invention.

An eye hook is attached to the strip of wood 34 on the back of the door. A string or similar thin, elongated, attachment means 72 is attached to it and then passes over a pulley 74 which is used to provide the necessary starting point for the string's downward or vertical path. This string is then attached to the end of a vertically hanging, circular dowel stick or similarly rod-shaped element or means 76 which has a free end 78 that passes through both a drilled out hole in the top of the frame's cross brace and a similar, drilled-out hole in a magnet 80 which is situated on this cross brace. A steel washer or ferromagnetic weight 82 is adhered to the dowel and set to hang slightly above this magnet 80. This washer provides enough weight to ensure a stead, gravitational pull downward on the dowel to stabilize it and to ensure that it moves downward when the door 30 opens due to a clogged filter.

The actual height above the cross brace at which the washer hangs is something that can be determined by a series of calibrating measurements, and is a function of, among other things, the actual size that is chosen for fabricating the present invention, the type of replaceable air filter that is chosen for use with the present invention, and what is used to define "excess fan motor strain." For example, when the present invention is fabricated with front and rear surfaces that measure 20"×20" and 20"×25" respectively, and with widths of the interior region's front and rear portion that are 3.25" and 6.25" respectively, and a 20"×25" Minimum Efficiency Reporting Value (MERV) 13 replaceable filter is placed in the apparatus' rear portion and standard, 20" square box fans are being in front and behind the invention's air chamber frame, a 1" diameter, steel washer need hang only approximately 0.25" above the cross bar in order to be an effective alarm indicator of a clogged MERV 13 filter. In this instance, we used a HVAC technique of using the change in coloration over time of a white sheet placed in front of the front fan to assess and quantify the filter's degree of clogging (i.e., sheet 5" in front, and if after an hour the sheet is noticeably gray, the filter is sufficiently clogged to need changing).

Once this situation exists, the force of the door's springs are overwhelmed and the door begins to open to allow outside air into the front portion 14a of the frame's interior region. As this happens, a portion of the string that is attached to it moves downward and the dowel's washer 82 moves closer to the magnet 80 below. After a calibrated amount of downward movement, the magnet's appropriately selected strength is such that it then pulls the washer further down until it makes contact with the below situated magnet. When this happens, a battery operated, electrical circuit is closed.

This circuit contains a signaling device 90 (located on the interior of the frame 10) or bulb (or other alarm means) that is then illuminated to alert those within sight of it that the apparatus' replaceable filter is clogged and needs to be replaced. Once the clogged filter is removed, the dowel is reset by lifting the steel washer off the magnet (thereby turning off the illuminated bulb) so that the dowel again hangs once more in its ready position. The apparatus is now ready for a new filter to be installed.

Additionally, the sides of the present invention can be easily modified to allow for the temporary or permanent insertion of a UV light within the interior region of the frame to yield a further improvement to the air cleaned by the combination. Such lights are very effective for eliminating microscopic organisms (e.g., like those that can be created within the ductwork of typical HVAC systems).

It can be noted that the apparatus 1 of the present invention has many desirable features, including: (a) portability, (b) can be configured to be used with both a wide range of various sized, box fans and replaceable, air filters (e.g., standard filters with thicknesses of 1-5 inches, and an approximately 1 inch thick, carbon filter if odor elimination is also needed), (c) because of its alarm/clogged filter signaling feature, it's safe for long term use, (d) it helps prevent an attached box fan from overheating, (e) with the addition of a box fan & air filter, it provides an inexpensive and convenient way to filter large amounts of contaminated air (e.g., from a wildfire) that is within one's home, and (f) it is much more efficient at cleaning air than the typical HVAC system (e.g., even though HVAC system runs intermittently, they can easily cost $40 or more worth of electricity to run per month, whereas a typical box fan usually costs less than $20 per month when running continuously).

While the present invention has above been described for use in crisis situations, it can also be used as a permanent unit. For example, in a bedroom, the unit can also act as a white noise maker to aid the bedroom's occupants in falling asleep as well as cleaning the bedroom's air of a wide range of pollutants, including smoke, pollen, allergens, odors, pet dander/hair, dust, viruses, etc.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is set forth hereafter in the claims to the invention.

I claim:

1. An apparatus for safely enabling air filtering by using a box fan that has a face and a surrounding edge, and a replaceable air filter which has a boundary edge, the apparatus comprising:
    an air chamber frame having a top, bottom and two sides and which encloses an interior region that includes a front and a rear portion, and wherein said top, bottom and two sides each have a front and a rear edge, and wherein said front edges combine to define the front surface of said air chamber frame and said rear edges combine to define the rear surface of said air chamber frame,
    wherein said front surface having a front opening that is configured to provide a front access to said interior region of said frame,
    wherein said rear surface having a rear opening that is configured to provide a rear access to said interior region of said frame, and said rear opening is configured to allow said replaceable air filter to pass through said rear opening,
    wherein said rear portion of said interior region is configured to temporarily accommodate said replaceable air filter so that said boundary edge is proximate said top, bottom and sides of said rear portion of said interior region,
    wherein said front surface is configured to enable said box fan surrounding edge to temporarily abut and lie proximate said front surface,
    an air chamber frame stabilizing projection that is attached to said bottom and includes a front mounting platform and which is configured to prevent said air chamber frame from tipping over when there is temporarily located on said front mounting platform said box fan that is oriented to pull air through said air chamber frame,
    a gasket that is configured to attach to said front surface and be compressed between said surrounding edge of said box fan to minimize air flow around said gasket and into said front portion of said interior region when said box fan is operating,
    a door located in said top that provides access to said front portion of said interior region,
    a door opening mechanism that is attached to said door and configured to open said door to allow air to enter said first portion when said replaceable air filter has been in service for a period and become clogged,
    an alarm mechanism that is attached to said door and configured to provide a signal when said door has been opened, and
    a signaling device that is located on said frame and configured to receive said alarm mechanism signal and provide a signal that said replaceable air filter is clogged and needs replacement.

2. The apparatus of claim 1, wherein:
said door opening mechanism is a hook and loop strip attached to said door.

3. The apparatus of claim 1, wherein:
said door has a surface area that is in the range of 1/10-1/6 of that of the surface area of the face of said fan.

4. The apparatus of claim 2, wherein:
said door has a surface area that is in the range of 1/10-1/6 of that of the surface area of the face of said fan.

5. The apparatus of claim 1, wherein:
said alarm mechanism includes an elongated member, a pulley, a rod-shaped element, a magnet and a ferromagnetic weight that is attached to said rod-shaped element and located above said magnet.

6. The apparatus of claim 2, wherein:
said alarm mechanism includes an elongated member, a pulley, a rod-shaped element, a magnet and a ferromagnetic weight that is attached to said rod-shaped element and located above said magnet.

7. The apparatus of claim 3, wherein:
said alarm mechanism includes an elongated member, a pulley, a rod-shaped element, a magnet and a ferromagnetic weight that is attached to said rod-shaped element and located above said magnet.

8. The apparatus of claim 4, wherein:
said alarm mechanism includes an elongated member, a pulley, a rod-shaped element, a magnet and a ferromagnetic weight that is attached to said rod-shaped element and located above said magnet.

9. The apparatus of claim 1, wherein:
said air chamber frame stabilizing means further includes a rear mounting platform that is configured to accommodate a box fan that is temporarily located on said rear mounting platform and oriented to push air through said filter.

10. The apparatus of claim 2, wherein:
said air chamber frame stabilizing means further includes a rear mounting platform that is configured to accommodate a box fan that is temporarily located on said rear mounting platform and oriented to push air through said filter.

11. The apparatus of claim 3, wherein:
said air chamber frame stabilizing means further includes a rear mounting platform that is configured to accommodate a box fan that is temporarily located on said rear mounting platform and oriented to push air through said filter.

12. The apparatus of claim 4, wherein:
said air chamber frame stabilizing means further includes a rear mounting platform that is configured to accommodate a box fan that is temporarily located on said rear mounting platform and oriented to push air through said filter.

13. The apparatus of claim 5, wherein:
said air chamber frame stabilizing means further includes a rear mounting platform that is configured to accommodate a box fan that is temporarily located on said rear mounting platform and oriented to push air through said filter.

14. The apparatus of claim 6, wherein:
said air chamber frame stabilizing means further includes a rear mounting platform that is configured to accommodate a box fan that is temporarily located on said rear mounting platform and oriented to push air through said filter.

15. The apparatus of claim 7, wherein:
said air chamber frame stabilizing means further includes a rear mounting platform that is configured to accommodate a box fan that is temporarily located on said rear mounting platform and oriented to push air through said filter.

16. The apparatus of claim 8, wherein:
said air chamber frame stabilizing means further includes a rear mounting platform that is configured to accommodate a box fan that is temporarily located on said rear mounting platform and oriented to push air through said filter.

17. The apparatus of claim 1, further comprising:
a strap that is configured to attach to said air chamber frame and temporarily adhere said box fan to said frame.

18. The apparatus of claim 2, further comprising:
a strap that is configured to attach to said air chamber frame and temporarily adhere said box fan to said frame.

19. The apparatus of claim 5, further comprising:
a strap that is configured to attach to said air chamber frame and temporarily adhere said box fan to said frame.

20. The apparatus of claim 9, further comprising:
a strap that is configured to attach to said air chamber frame and temporarily adhere said box fan to said frame.

* * * * *